(12) United States Patent
DeBruler et al.

(10) Patent No.: US 7,278,104 B1
(45) Date of Patent: Oct. 2, 2007

(54) GRAPHICAL USER INTERFACE FOR MANAGING NETWORK ELEMENTS

(75) Inventors: Dennis DeBruler, Downers Grove, IL (US); Margaret Giovacchini, St. Charles, IL (US); Emrah Onal, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1212 days.

(21) Appl. No.: 09/703,878

(22) Filed: Nov. 2, 2000

(51) Int. Cl.
*G06F 15/177* (2006.01)
(52) U.S. Cl. .................................................. 715/736
(58) Field of Classification Search ................ 345/734, 345/735, 736, 810; 709/223, 224; 715/733, 715/734, 735, 736
See application file for complete search history.

(56) References Cited

U.S. PATENT DOCUMENTS

| | | | |
|---|---|---|---|
| 5,491,796 A | | 2/1996 | Wanderer et al. |
| 5,821,928 A | * | 10/1998 | Melkus et al. ............... 345/809 |
| 5,960,411 A | | 9/1999 | Hartman et al. |
| 5,987,442 A | * | 11/1999 | Lewis et al. .................... 706/10 |
| 6,115,743 A | * | 9/2000 | Cowan et al. ............... 709/224 |
| 6,269,396 B1 | * | 7/2001 | Shah et al. .................. 709/223 |
| 6,456,306 B1 | * | 9/2002 | Chin et al. ................... 345/810 |
| 6,484,261 B1 | * | 11/2002 | Wiegel ........................ 713/201 |

OTHER PUBLICATIONS

Allen Holub, "User interfaces for object-oriented systems, Part 4: Menu negotiation; A scalable architecture for building object-oriented user interfaces," Web Publishing Inc., Java World, Dec. 1999.

* cited by examiner

*Primary Examiner*—Kristine Kincaid
*Assistant Examiner*—Thanh Vu

(57) ABSTRACT

The present invention provides a user-friendly graphical user interface (GUI) that may be employed to remotely manage a plurality of network elements. One feature of the GUI is a graphical representation of a series of state transition diagrams (STDs). The GUI displays each STD upon receiving a command from a technician. The STDs provide a unique window into the present state and possible future states of a specific network element. Furthermore, the GUI is configured to be fool-proof in that the technician may select from only relevant actions. That is, the GUI prevents accidental engagement of an action by having the technician select a command from a pull-down menu where the only commands the user may choose from are those that are relevant to the current state of the selected network element. For example, a network element that is currently in service would not have a restore command included in its pull-down menu.

61 Claims, 8 Drawing Sheets

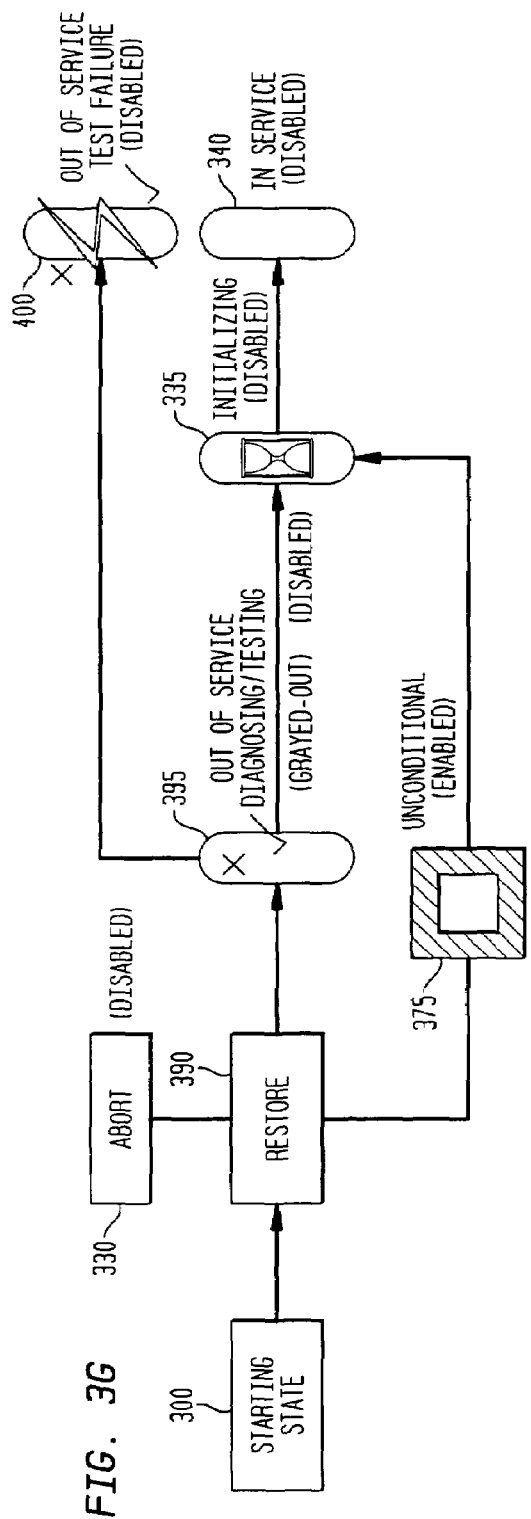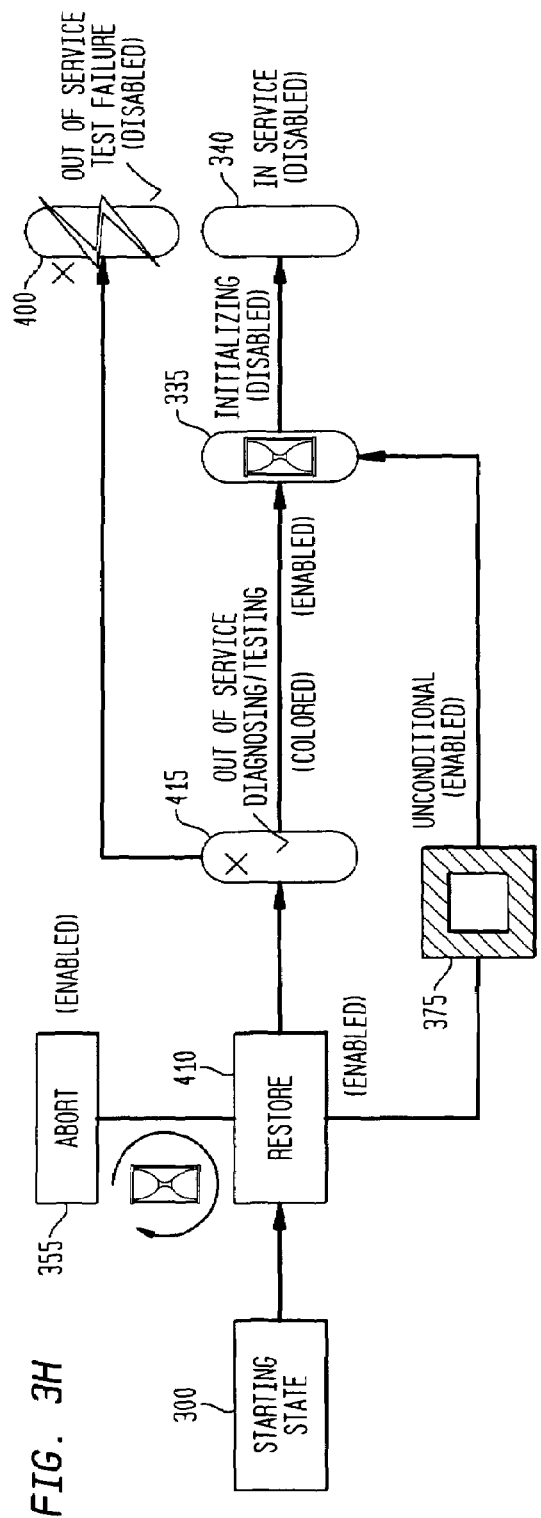

GRAPHICAL USER INTERFACE FOR MANAGING NETWORK ELEMENTS

BACKGROUND OF THE INVENTION

1. Field of the Invention

The present invention relates to the field of networked elements. More specifically, it relates to a graphical user interface (GUI) for managing a plurality of elements that forms a network.

2. Description of the Related Art

The GUI is a useful tool generally employed by technicians who monitor the operating status of a plurality of network elements (e.g., networked devices, individual ports of networked devices, etc.). The GUI allows the technician to remotely view the status of physical network elements from a central management station. Through the GUI, the technician can remove individual elements from the network, restore individual elements within the network, put the network element through a series of diagnostic tests to determine the existence and/or nature of a problem, etc.

GUIs take on many different forms and, in general, can be tailored to the requirements of a specific network. For example, the GUI can be configured to alert the technician if a network element develops a problem, or to automatically remove a network element upon the detection of a predetermined set of parameters, etc.

As networks become larger and more complex, so too must the GUIs that help manage those networks. One problem experienced with some GUIs is that they are not always as user-friendly and as fool-proof as might have been originally intended. Thus, an improved, user-friendly, fool-proof GUI is desirable for use with managing networked elements.

SUMMARY OF THE INVENTION

The present invention provides an improved GUI that may be employed to remotely manage a plurality of network elements. The GUI provides a unique graphical representation of the present and possible future states of the networked element, called state transition diagrams (STDs). The GUI displays each STD upon receiving one of several predetermined instructions from a user. In addition, the STDs provide the technician with an opportunity to bypass certain actions that would otherwise be performed by the GUI. For example, a technician may choose to bypass the performance of a diagnostic test before placing the network element back in service.

Furthermore, the GUI is configured to be fool-proof in that the technician may select from only relevant actions. That is, the GUI prevents accidental engagement of an action by having the technician select a command from a pull-down menu where the only commands the user may choose from are those relevant to the current state of the selected network element. For example, a network element that is currently in service would not have a restore command included in its pull-down menu.

BRIEF DESCRIPTION OF THE DRAWINGS

These and other features and advantages of the invention will become more readily apparent from the following detailed description which is provided in connection with the accompanying drawings in which.

DETAILED DESCRIPTION OF PREFERRED EMBODIMENTS

Preferred embodiments and applications of the invention will now be described with reference to FIGS. 1-4. Other embodiments may be realized and structural or logical changes may be made to the disclosed embodiments without departing from the spirit or scope of the invention.

Figure 1:
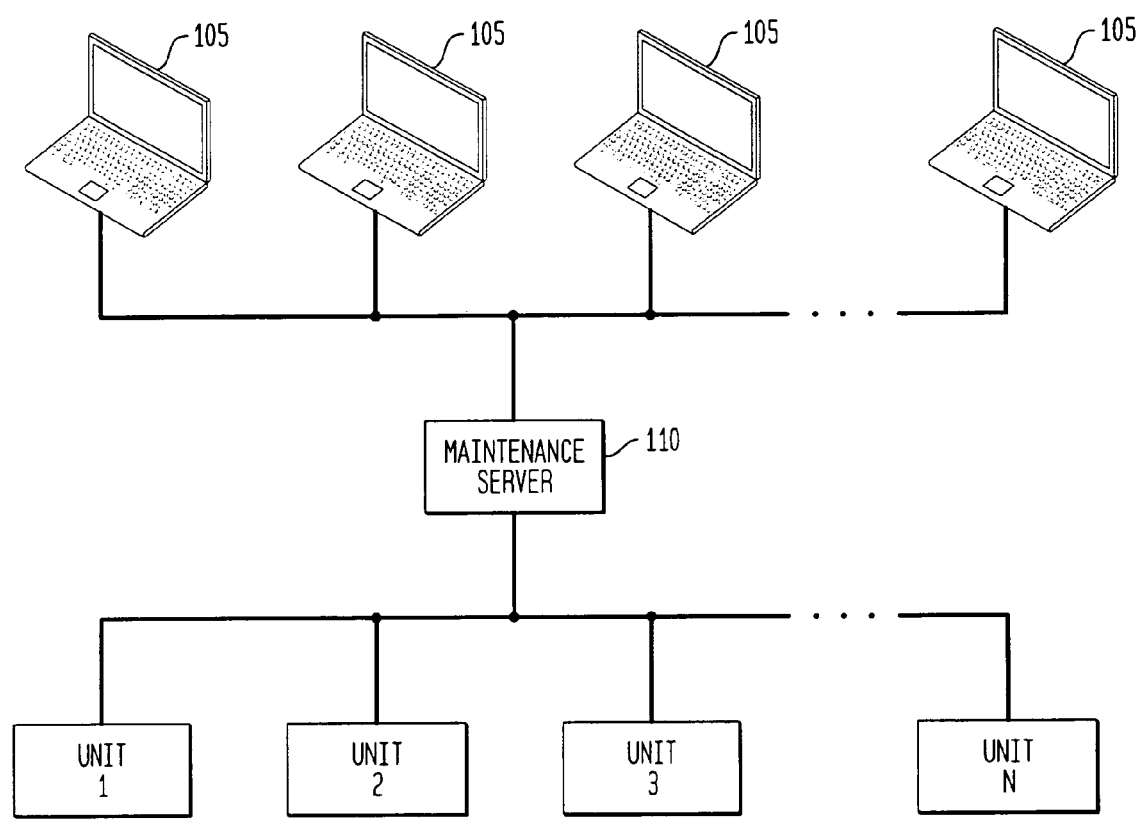
FIG. 1 depicts a plurality of networked elements managed with a graphical user interface in accordance with an exemplary embodiment of the invention.

FIG. 1 depicts a network 100 containing a plurality of networked elements (Units 1-N) managed with a graphical user interface (GUI) in accordance with an exemplary embodiment of the invention. A plurality of computers 105 is depicted as running a software program containing the GUI in accordance with a preferred embodiment of the invention. Coupled to each computer 105 is a maintenance server 110 for coordinating instructions to Units 1-N and for coordinating feedback from Units 1-N to computers 105. Coupled to maintenance server 110 is a plurality of managed network elements (Units 1-N). Units 1-N may be, for example, speech servers, speech processing cards, telephone interface cards, routers, switches, etc. That is, any device or element capable of being networked and managed may be included in a network managed by the GUI of the invention. Computers 105 may be laptop computers (as depicted), a desktop computer, or any other processor-based system configured to manage a plurality of networked elements (Units 1-N).

Figure 2:
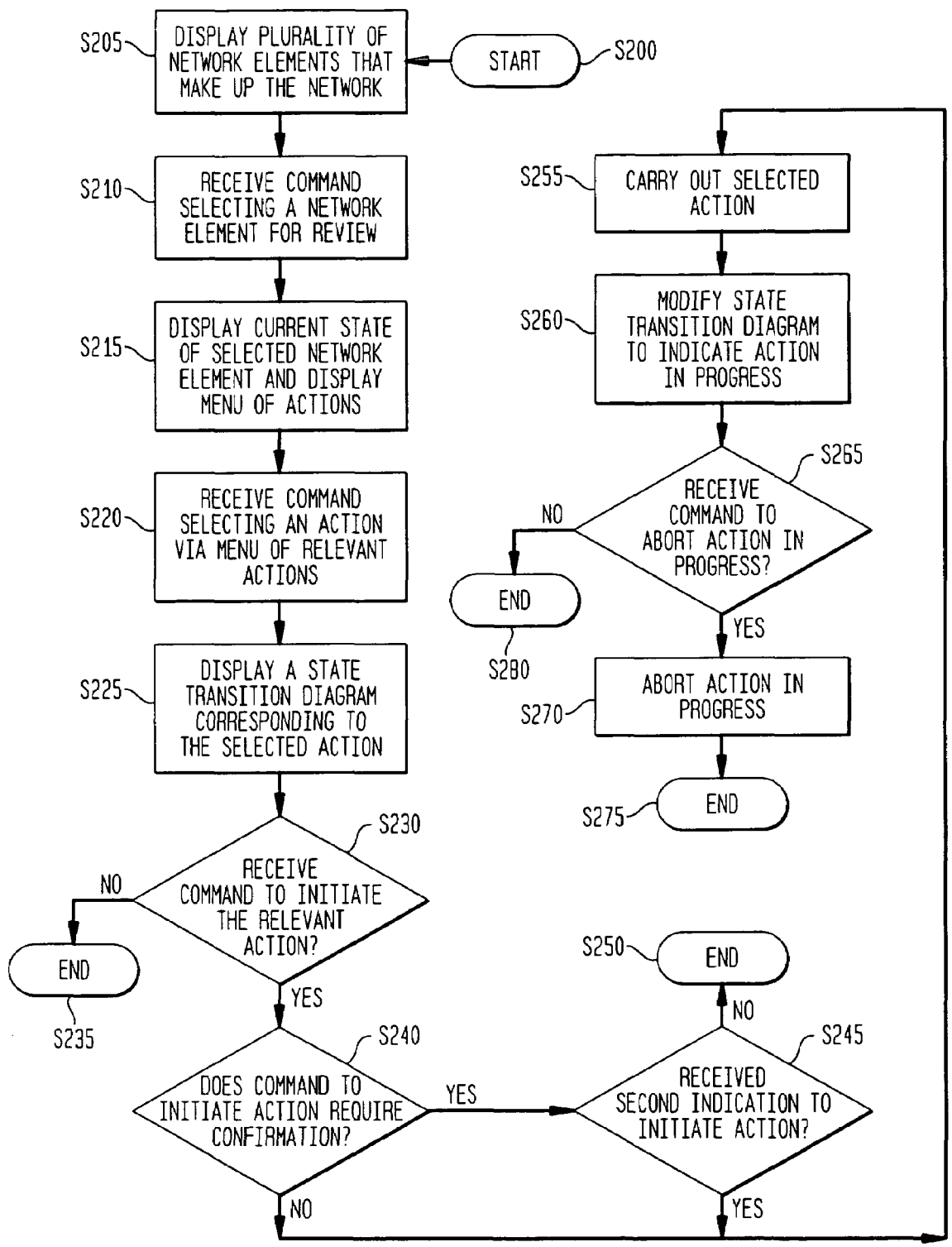
FIG. 2 depicts a flowchart illustrating an exemplary operational flow of the graphical user interface in accordance with an embodiment of the invention.

FIG. 2 depicts a flowchart illustrating an exemplary operational flow of the GUI in accordance with an embodiment of the invention. The operational flow begins at portion S200. At portion S205, the computer 105 displays identifiers (e.g., port numbers, location designators, etc.) for a plurality of elements that make up the network 100. At portion S210 computer 105 receives a command from a user selecting a specific element of the network 100 for review. At portion S215, the GUI displays via at least one of the computers 105 the current state of the selected network element and also displays a pull-down menu containing a list of possible actions that may be taken by the user in connection with the selected element (for example, Unit 1 of FIG. 1). Examples of data available for the current state are current ambient temperature of the element, the element's geographic location, a status history of the element, the manufacturer and part number of the element, an arbitrary identifier of the element, whether the element is currently in or out of service, etc. At portion S220, computer 105 receives a command selecting a relevant action via the pull-down menu. At portion S225, the GUI displays a state transition diagram (STD) via computer 105 corresponding to the selected action. In accordance with an exemplary embodiment of the invention, the STD displays the present and possible future states of the element, thereby providing a user with enough information to make an informed decision as to the next step which should be taken with the element (Unit 1).

At portion S230, computer 105 determines whether it has received a command to initiate the relevant action. If not, the sequence ends at portion S235. If a command to initiate has been received at portion S230, computer 105 determines whether the command to initiate requires verification at portion S240. If not, the selected action is carried out at portion S255. If, however, confirmation is required at portion S240, computer 105 determines whether it has received a second indication to initiate the selected action at portion S245. If not, the sequence ends at portion S250. If a second indication has been received, the selected action is carried out at portion S255.

At portion S260, the STD is modified to indicate the selected action is in progress. At portion S265, computer 105 determines whether it has received a command to abort the action in progress. If not, the sequence ends at portion S280 and the action continues to be carried out. If an abort command is received, the action in progress is aborted at portion S270 and the sequence is ended at portion S275.

Turning now to FIGS. 3(*a*)-3(*k*), a plurality of STDs in accordance with preferred embodiments of the present invention will now be described. FIG. 3(*a*) depicts a portion of an STD. On the left side of the STD, a starting state 300 is depicted. The starting state 300 may be one of several states that the network element is currently in, such as, for example, In-Service, Out of Service Manual, as will be described more fully below. That is, each STD displays the starting state 300, the current state and possible future states of the network element depending upon the selected action (i.e., the action selected via the pull-down menu).

For each action, the GUI presents the user with a pull-down menu including the available commands. Each command, after it has been selected via the pull-down menu, requires a command to initiate the selected action. This is done by having the user select (e.g., click on) the icon that pops up onto the GUI for the selected action. Some actions, e.g., the Remove command, aside from requiring a command to initiate, also require a second indication from the user to initiate the action.

FIG. 3(*a*) depicts the selected action as being a loopback command 305. In accordance with an exemplary embodiment of the present invention, the loopback command 305 may be used with a telephone interface card having a plurality of ports that may be connected and disconnected from a communications network (e.g., 100 of FIG. 1). As is known in the art, a loopback is achieved by disconnecting a port from the network and looping it back into itself (e.g., for testing purposes, etc.), thereby taking the port out of service as far as the network 100 is concerned. As depicted, an Out of Service-Loopback graphic 310 is displayed but remains disabled until the GUI has had a chance to actually carry out the Loopback operation on, in this case, the selected port of the selected network element. When the loopback operation is in progress, a rotating or animated hourglass appears on top of loopback command graphic 305. Once the loopback operation has been completed, the Out of Service-Loopback graphic 310 is highlighted (or enabled) and represents the current state. For example, graphic 310 changes from a disabled (e.g., grayed-out) graphic to an enabled (e.g., red) graphic with an illustration of a black "looped arrow" superimposed on a red ellipse, indicating Out of Service-Loopback as the current state of the selected port.

FIG. 3(*b*) depicts an STD for an Unloopback command 315. As in FIG. 3(*a*), the starting state 300 may be one of several states, including a Loopback state. The next state of the FIG. 3(*b*) state transition diagram is an Out of Service-Manual graphic 320 which is in a disabled state. As depicted, the graphic 320 is an ellipse having its major axis in a vertical direction and its minor axis in a horizontal direction with a graphical illustration of a wrench superimposed on the ellipse. Similarly to FIG. 3(*a*), once the GUI has carried out the Unloopback action (an action which is essentially opposite that of the above-described Loopback action; however, the element is not yet back in service until a Restore operation is performed), the Out of Service-Manual graphic 320 is enabled, thus indicating that the current state of the selected port of the selected element is that it has been manually taken out of service. The appearance of the Out of Service-Manual graphic 320 may change from a grayed-out state to a colored state, for example. Any other change in appearance may be implemented to indicate the transition from a disabled state to an enabled state.

Turning now to FIG. 3(*c*), another STD is depicted. Previous state 300 is depicted as being coupled to a Restore command graphic 325. Restore command graphic 325 is depicted as being coupled to an Abort command graphic 330 (currently disabled). Restore command graphic 325 is coupled to an Initializing graphic 335 (currently disabled and, e.g., grayed-out). The Initializing graphic 335 is coupled to an In-Service graphic 340 (currently disabled and, e.g., grayed-out).

Upon selecting the Restore action from, e.g., a pull-down menu, the FIG. 3(*c*) STD is displayed on the screen. The Restore command restores the selected element back into service within the network 100. In accordance with an exemplary embodiment of the invention, the user must provide the GUI with a command to initiate the Restore command. Upon selecting the Restore command graphic 325, the Restore command is in progress. Once the Restore command is in progress, the Abort command graphic 330 is enabled, allowing the user to abort the Restore command.

Turning now to FIG. 3(*d*), the FIG. 3(*c*) STD is depicted after the GUI has received, via computer 105, an indication (e.g., a click on the Restore graphic 325) that the user wishes to carry out the Restore operation. Upon receiving the indication, Restore graphic 325 transitions into Restore graphic 350 with an hourglass graphic above it rotating in a clockwise direction. Restore graphic 350 indicates that the Restore command is in progress. In addition, disabled Abort graphic 330 transforms into enabled Abort graphic 355, thereby indicating it is ready to accept an indication (e.g., a click from a mouse or other cursor pointing device, etc.) that the user wishes to abort the Restore operation currently in progress. Upon receiving an Abort command, the selected element cancels the Restore operation.

Similarly, upon receiving an indication from the user to carry out the Restore command, the Initializing graphic is transformed from disabled graphic 335 (of FIG. 3(*c*)) to enabled graphic 360. The enabled state of the Initializing graphic 360 is illustrated by its changing color from a grayed-out graphic to an enabled (e.g., yellow) graphic with an illustration of an hourglass superimposed on a yellow ellipse, indicating initialization as the current state of the selected element. The Initialization stage may be desired by a user before restoring the element or device (e.g., Unit 1) within the network 100. To the far right of the FIG. 3(*d*) STD is an In-Service graphic 340 (disabled).

Turning now to FIG. 3(*e*), an STD for a Remove command, which will remove the selected element from the network 100, is depicted in accordance with an exemplary embodiment of the invention. Starting state 300 is as described above and is depicted as being coupled to a Remove graphic 365 that is in a first enabled state. The Remove command requires a second indication from the user before it may be carried out. Above the Remove graphic 365 is an Abort graphic 330 in a disabled state, the operation of which is identical to the operation of Abort command graphic 330 of FIG. 3(c). To the right of the Remove graphic 365 is a Camped-On graphic 370 in a disabled state. The Camped-On graphic 370, when enabled (as 385 in FIG. 3(f)), indicates the element to be removed is currently in use and the Camped-On graphic will become the current state. For example, when the Camped-On graphic is enabled, as 385 in FIG. 3(f), it signifies that a predetermined set of actions, such as waiting for all calls currently using the resource to gracefully terminate, is being carried out. The STD will not advance to the Out of Service-Manual graphic 320 until the selected network element is no longer in use. In addition, there is a selectable Unconditional graphic 375 coupled between the Remove graphic 365 and the Out of Service-Manual graphic 320. Upon selecting the Remove action from, e.g., a pull-down menu (not shown), and after the STD of FIG. 3(e) is displayed, the user may select the Unconditional graphic 375 (for example, by clicking within the confines of the box) in order to bypass the Camped-On command 370 as described further below.

Figure 3A:
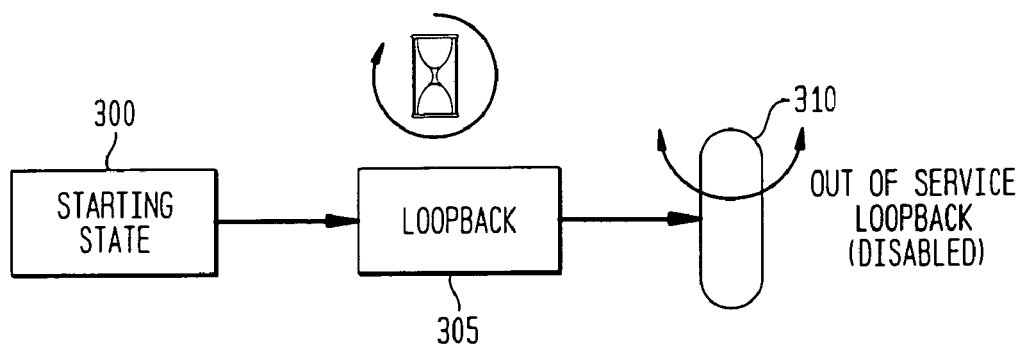
FIGS. 3($a$)-3($k$) depict exemplary state transition diagrams in accordance with an embodiment of the invention.
Figure 3B:
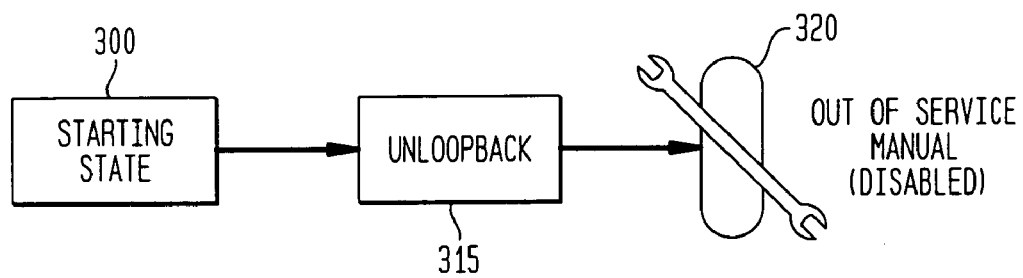
Figure 3C:
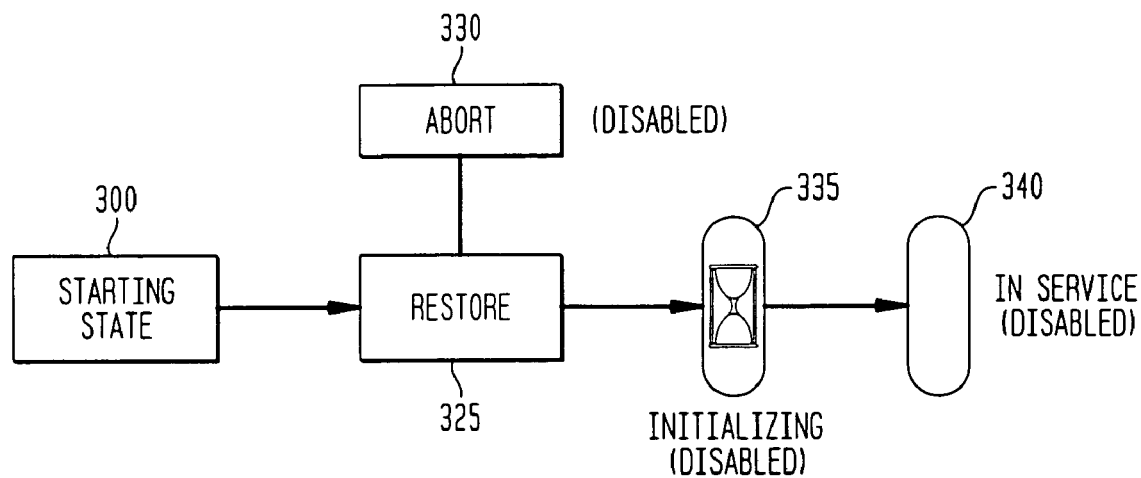
Figure 3D:
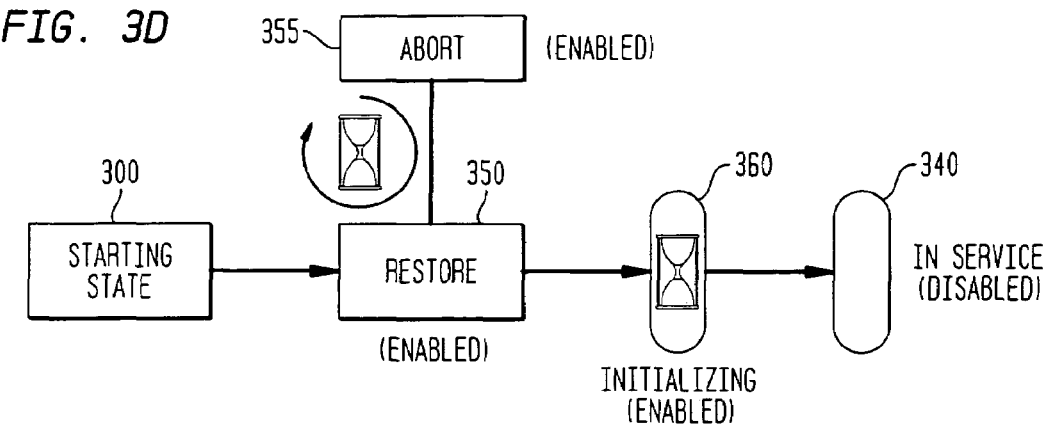
Figure 3E:
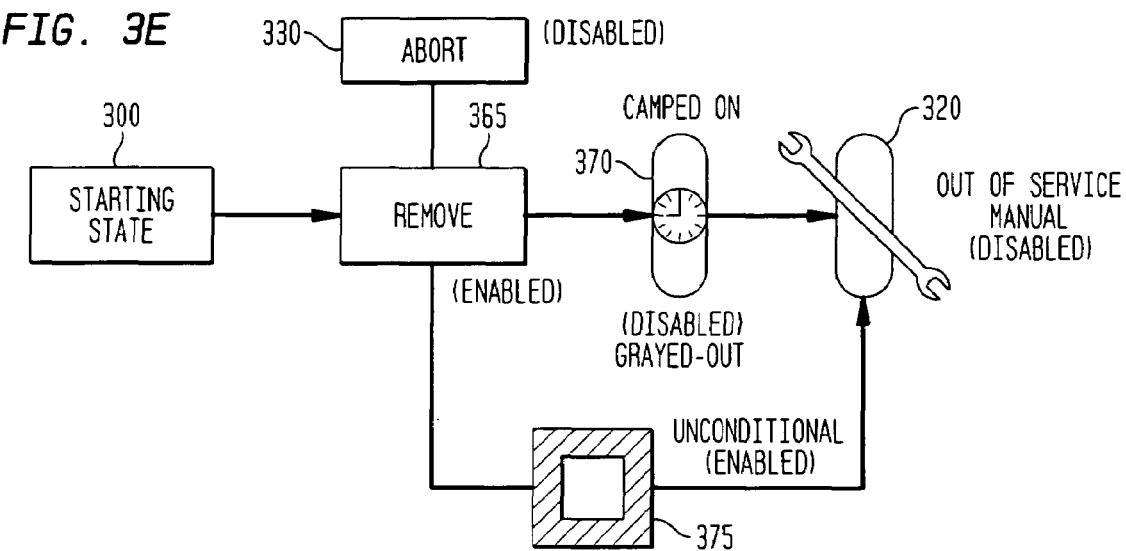
Figure 3F:
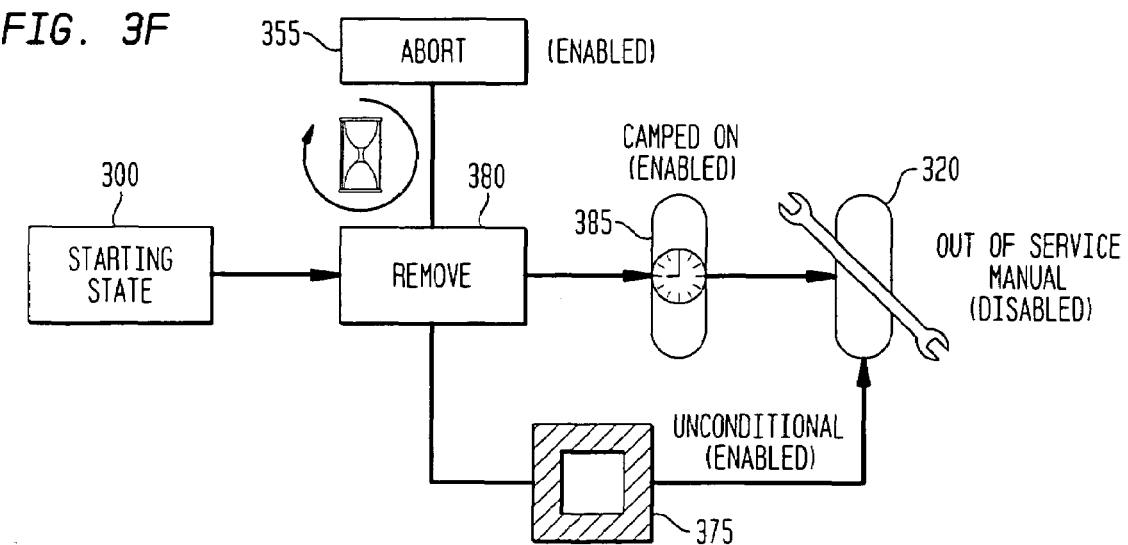

Turning now to FIG. 3(f), an STD identical to that of FIG. 3(e) is depicted except that the user has given a second indication to remove the selected element from the network 100. Upon clicking the Remove graphic 365 for a second time, the STD of FIG. 3(e) is transformed into the STD of FIG. 3(f) in which the Remove graphic 380 illustrates a rotating hourglass on top of the graphic 380. In addition, upon receiving a second indication from the user, the Camped-On graphic 370 is transformed from a disabled state 370 to the enabled Camped-On graphic 385. As indicated in FIG. 3(f), when the Camped-On graphic 385 is enabled, it changes its appearance from, e.g., a grayed-out graphic as in FIG. 3(e) to a color graphic as in FIG. 3(f) to indicate it is the current state of the selected network element.

To the right of the Camped-On graphic 385 is an Out of Service-Manual graphic 320 which is still disabled and will remain disabled until the GUI has completed the Removal process. Upon completing the removal process, the STD transforms such that the Remove graphic 380 and the Camped-On graphic 385 are disabled and the Out of Service-Manual graphic 320 becomes enabled, thus indicating to the user that the selected element (e.g., Unit 1) has successfully been removed and placed out of service. Similarly to FIG. 3(e), FIG. 3(f) contains an Unconditional graphic 375 which may be selected to bypass the Camped-On step 385. That is, a user may bypass the wait period before removal and immediately remove a selected network element.

Turning now to FIG. 3(g), an alternative STD for the Restore command is depicted in accordance with an exemplary embodiment of the invention. Upon selecting the Restore command from, e.g., a pull-down menu, the GUI displays, via computer 105, the FIG. 3(g) STD. As described above, the user must provide the GUI with a command to initiate the Restore command. Upon selecting the Restore graphic 390, the Restore command is in progress. Once the Restore command is in progress, the Abort command graphic 330 is enabled, allowing the user to abort the Restore command. To the right of the Restore graphic 390 is an Out of Service-Diagnosing/Testing (OOS-D/T) graphic 395 in a disabled state. The OOS-D/T graphic 395 consists of an ellipse having its major axis in the vertical direction with an "x" at a top left portion of the ellipse and a check mark at a bottom right portion of the ellipse. The OOS-D/T graphic 395 signifies that before the selected element is restored within the network 100, a predetermined set of tests is performed on the element.

As shown in FIG. 3(g), there are two possible results of the testing performed as indicated by the OOS-D/T graphic 395: the first being an Initializing graphic 335 (as described above in connection with FIGS. 3(c) and 3(d)) and an Out of Service-Test Failure (OOS-TF) graphic 400 as depicted in a top right portion of FIG. 3(g). The appearance of the OOS-TF graphic 400 is identical to that of the OOS-D/T graphic 395 with the exception of the addition of a lightning bolt superimposed through the center of the ellipse.

If, after the predetermined tests are performed on the selected element before it is restored into the network 100 it is determined that the element has failed at least one of the tests, the element will be considered unsuitable for use in the network 100. As a result, in accordance with an embodiment of the invention, the element will automatically be taken out of service by the computer 105 and the GUI will inform the user of that fact by placing the OOS-T/F graphic 400 in an enabled state.

If the OOS-T/F graphic 400 is in an enabled state, it may, for example, take on certain predetermined colors rather than being grayed-out (disabled). If, however, after the testing has been performed the element is determined to be suitable for use in the network 100, the Initializing graphic 335 will become enabled and thereafter the In-Service graphic 340 will also become enabled once the element has been successfully restored into the network 100.

Similar to FIGS. 3(e) and 3(f), FIG. 3(g) contains an Unconditional graphic 375 between the Restore graphic 390 and the Initializing graphic 335. The operation of the Unconditional graphic 375 is identical to that described above.

Turning now to FIG. 3(h), an STD is depicted which is identical to that of the FIG. 3(g) STD except that the user has given an indication that he/she would like to carry out the Restore operation. That is, for example, upon clicking the Restore graphic 390, the graphic 390 is transformed from an enabled state 390 to an in-progress state graphic 410 including, for example, an animated hourglass rotating in a clockwise direction. In addition, the grayed-out OOS-D/T graphic 395 is transformed into the colored (e.g., red) OOS-D/T graphic 415 with the illustration of an "x" and a check mark superimposed on a red ellipse indicating OOS-D/T as the current state of the selected element.

Figure 3I:
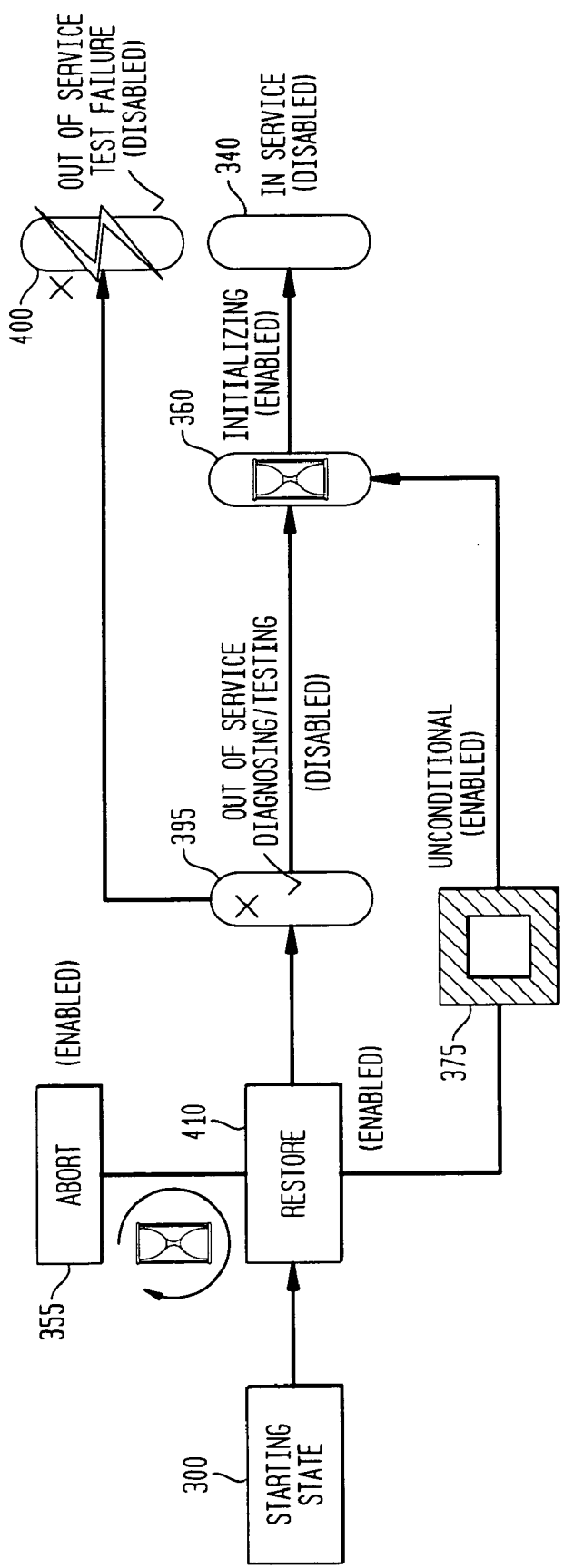

Turning now to FIG. 3(i), an STD identical to that of FIGS. 3(g) and 3(h) is depicted, except that the colored enabled OOS-D/T graphic 415 is transformed into the grayed-out disabled OOS-D/T graphic 395 (of FIG. 3(g)) signifying that the predetermined test pattern has been performed. Since the Initializing graphic 360 is depicted as being in an enabled state, the user is informed that the element has passed the testing performed and is suitable for being restored into the network 100. After initializing, the element is restored into the network 100, and the In-Service graphic 340, to the far right of FIG. 3(i), will become enabled.

Figure 3J:
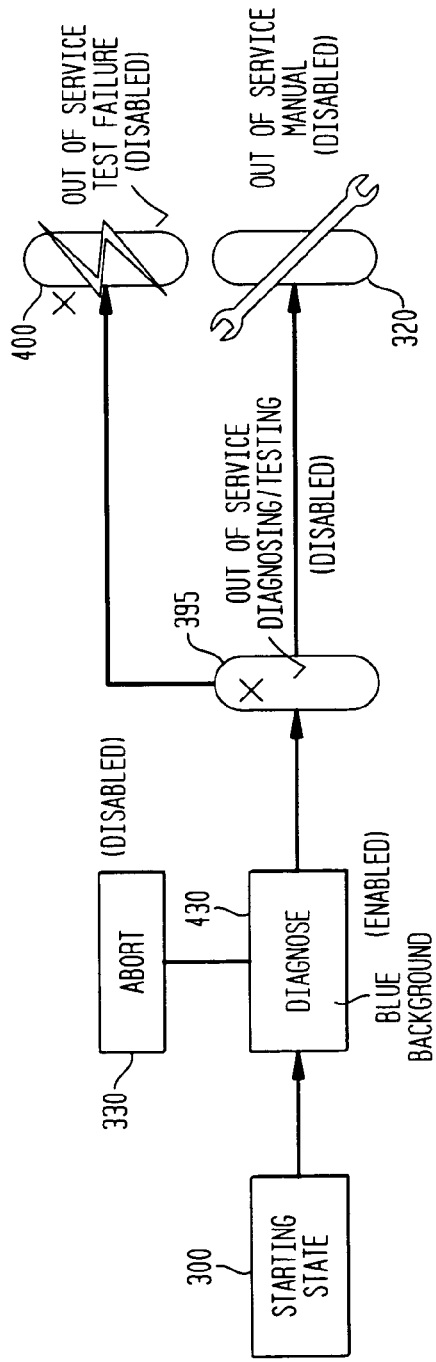

FIG. 3(j) depicts an STD displayed when the user selects the Diagnose command from, e.g., a pull-down menu. Upon selecting the Diagnose command from the pull-down menu, the Diagnose graphic 430 is enabled and the Abort graphic 355 is disabled. To the right of the Diagnose graphic 430 is an OOS-D/T graphic 395 in a disabled state meaning that the GUI has not yet begun to perform the predetermined tests on the selected element. As depicted in FIG. 3(j), there are two possible outcomes from the OOS-D/T operation: the first being signified by an OOS-TF graphic 400 and the second being signified by an OOS-Manual graphic 320, both currently disabled.

Figure 3K:
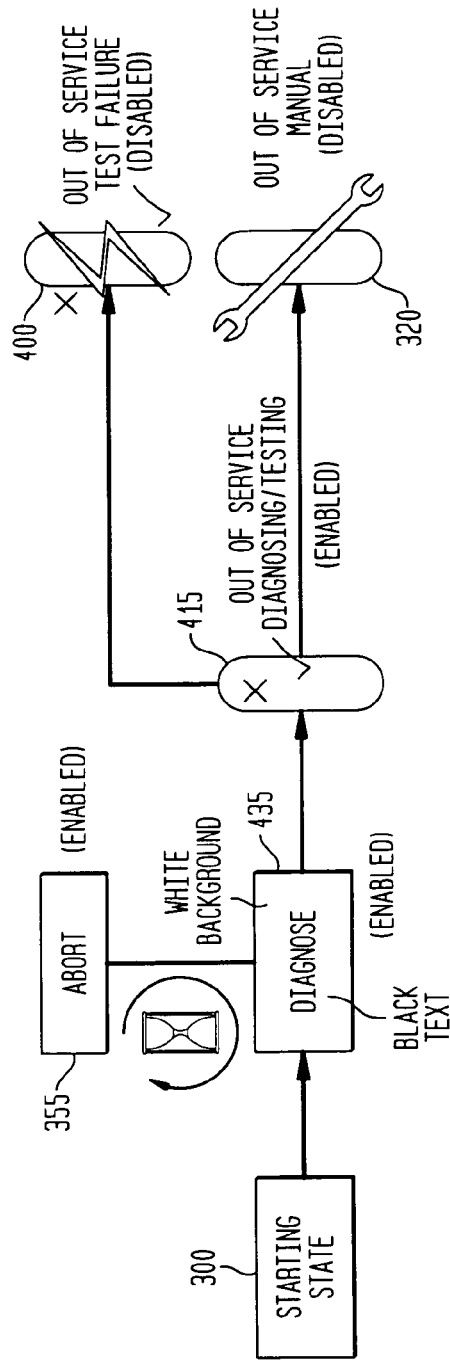

Turning to FIG. 3(k), the FIG. 3(j) STD is depicted in which the user has given an indication that he/she wishes to carry out the Diagnose operation. That is, for example, upon clicking on the Diagnose graphic 430, it is transformed into the animated diagnose graphic 435, having, e.g., a white background, black text and a rotating hourglass on top, whereas the disabled Diagnose graphic 430 of FIG. 3(j) contains, e.g., a blue background. In addition, the OOS-D/T graphic 395 is transformed into the OOS-D/T graphic 415 in an enabled state. Depending upon the outcome of the testing being performed as indicated by OOS-D/T graphic 415, either one of the OOS graphics 400 or 320 will become enabled.

Figure 4:
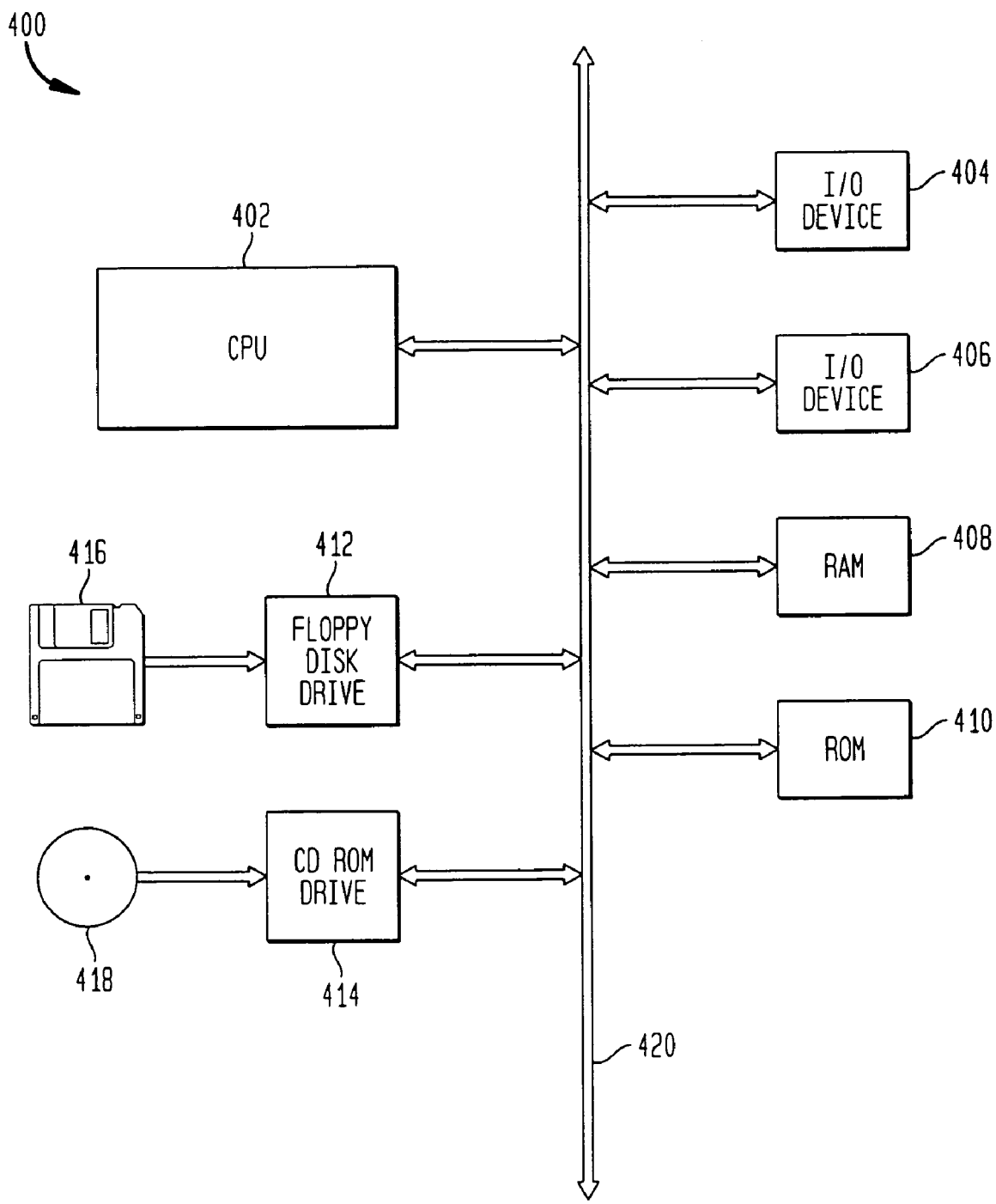
FIG. 4 illustrates a block diagram of a processor-based system running a GUI in accordance with the present invention.

FIG. 4 illustrates a block diagram of a processor-based system 400 for use with running a GUI in accordance with the present invention. That is, the GUI may be the GUI illustrated in the flowchart of FIG. 2 and capable of displaying STDs as described in FIGS. 3(a)-3(k). The processor-based system 400 may be a computer system or any other system having a memory device capable of storing the GUI of the invention. The system 400 includes a central processing unit CPU 402, e.g., a microprocessor that operates in a manner consistent with the exemplary flowchart of FIG. 2. The CPU 402 communicates with a memory (e.g., ROM 410, floppy disk 416, compact disk 418, etc.) storing the GUI over bus 420. It must be noted that the bus 420 may be a series of busses and bridges commonly used in a processor-based system but, for convenience purposes only, the bus 420 has been illustrated as a single bus. An input/output (I/O) device (e.g., a monitor) 406 is also connected to the bus 420 for displaying the GUI to a user. Processor-based system 400 may also include peripheral devices such as a floppy disc drive 412 (for reading floppy disk 416) and a compact disc (CD) ROM drive 414 (for reading CD 418). These peripheral devices 412 and 414 also communicate with the CPU 402 over the bus 420 as is well known in the art.

The present invention provides a user friendly GUI that may be employed to remotely manage a plurality of elements making up a network. It should be apparent that many modifications can be made to the invention without departing from its spirit or scope. For example, the invention is not limited to the specific network elements discussed or described above but may be used with any number and type of network elements. In addition, although the invention has been described in connection with specific state transition diagrams, it should be readily apparent that many different graphics and/or combinations of graphics may be used without deviating from the spirit or scope of the present invention. For example, predetermined graphics may depict a "shield" as part of the STD thus signifying that an added measure of protection is associated with the selected command. For instance, if, after the user selects the command from the pull-down menu and commands the GUI to initiate the command, the user does not give a second indication to carry out the command within a predetermined period of time (e.g., five seconds), the command option is reset.

Accordingly, the invention is not limited by the foregoing description or drawings but is only limited by the scope of the appended claims.

What is claimed as new and desired to be protected by Letters Patent of the United States is:

1. A method for managing a plurality of network elements, the method comprising:
   displaying a current state of a network element selected from said plurality of network elements;
   displaying a plurality of selectable commands, each of said plurality of selectable commands being associated with a respective operation, the respective operation affecting the interaction of the selected network element with at least one of the other network elements;
   detecting a selection of one of said selectable commands;
   displaying a state transition diagram corresponding to said selected command, wherein said state transition diagram illustratively depicts at least one predetermined future state of said selected network element that would be realized upon said respective operation associated with said selected command being performed on said selected network element; and
   performing said respective operation associated with said selected command.

2. The method of claim 1 further comprising:
   displaying said plurality of network elements being managed; and
   detecting a selection of at least one of said plurality of network elements.

3. The method of claim 1 further comprising:
   detecting that said selected command requires a confirming selection; and
   detecting a confirming selection of said selected command before performing said respective operation associated with said selected command.

4. The method of claim 1 further comprising:
   detecting that said selected command requires a confirming selection; and
   aborting said selected command.

5. The method of claim 4 further comprising detecting that a confirming selection of said selected command has not been received within a predetermined time after said selected command is selected.

6. The method of claim 1, wherein said act of displaying a current state comprises displaying whether said selected network element is currently in service.

7. The method of claim 1, wherein said act of displaying a current state comprises displaying a current ambient temperature of said selected network element.

8. The method of claim 1, wherein said act of displaying a current state comprises displaying a location of said selected network element.

9. The method of claim 1, wherein said act of displaying a current state comprises identifying the type of network element.

10. The method of claim 1, wherein said act of displaying a current state comprises displaying a status history of said selected network element.

11. The method of claim 1, wherein said act of displaying a plurality of selectable commands comprises displaying a pull-down menu containing said plurality of selectable commands.

12. The method of claim 1, wherein said act of displaying a plurality of selectable commands comprises displaying at least one command from a group consisting of restore, remove, diagnose, loopback, and unloopback.

13. The method of claim 1, wherein said act of displaying a state transition diagram comprises illustratively depicting a starting state of said selected network element.

14. The method of claim 1, wherein said act of performing said respective operation comprises performing a restore operation associated with a restore command.

15. The method of claim 1, wherein said act of performing said respective operation comprises performing a remove operation associated with a remove command.

16. The method of claim 1, wherein said act of performing said respective operation comprises performing a diagnose operation associated with a diagnose command.

17. The method of claim 1, wherein said act of performing said respective operation comprises performing a loopback operation associated with a loopback command.

18. The method of claim 1, wherein said act of performing said respective operation comprises performing an unloopback operation associated with an unloopback command.

19. A method for managing a plurality of network elements, the method comprising:
displaying a current state of a network element selected from said plurality of network elements;
displaying a plurality of selectable commands, each of said plurality of selectable commands being associated with a respective operation, the respective operation affecting the interaction of the selected network element with at least one of the other network elements;
detecting a selection of one of said selectable commands;
displaying a state transition diagram corresponding to said selected command, wherein said state transition diagram illustratively depicts at least one predetermined future state of said selected network element that would be realized upon said respective operation associated with said selected command being performed on said selected network element;
detecting that said selected command requires a confirming selection;
detecting a confirming selection of said selected command; and
performing said respective operation associated with said selected command.

20. A system for managing a plurality of network elements, the system comprising a plurality of network elements coupled to a managing computer, said managing computer running a software program configured to operate the managing computer to:
display a current state of a network element selected from said plurality of network elements;
display a plurality of selectable commands, each of said plurality of selectable commands being associated with a respective operation, the respective operation affecting the interaction of the selected network element with at least one of the other network elements;
detect a selection of one of said selectable commands;
display a state transition diagram corresponding to said selected command, wherein said state transition diagram illustratively depicts at least one predetermined future state of said selected network element that would be realized upon said respective operation associated with said selected command being performed on said selected network element; and
operate the managing computer to ensure that said respective operation associated with said selected command is performed.

21. The system of claim 20, wherein said software program is further configured to operate the managing computer to:
display said plurality of network elements being managed; and
detect a selection of at least one of said plurality of network elements.

22. The system of claim 20, wherein said software program is further configured to operate the managing computer to:
detect that said selected command requires a confirming selection; and
detect a confirming selection of said selected command before ensuring that said respective operation associated with said selected command is performed.

23. The system of claim 20, wherein said software program is further configured to operate the managing computer to:
detect that said selected command requires a confirming selection; and
abort said selected command.

24. The system of claim 23, wherein said software program is further configured to detect that a confirming selection of said selected command has not been received within a predetermined time after said selected command is selected.

25. The system of claim 20, wherein said software program is configured to operate the managing computer to display whether said selected network element is currently in service.

26. The system of claim 20, wherein said software program is configured to operate the managing computer to display a current ambient temperature of said selected network element.

27. The system of claim 20, wherein said software program is configured to operate the managing computer to display a location of said selected network element.

28. The system of claim 20, wherein said software program is configured to operate the managing computer to identify the type of network element that has been selected.

29. The system of claim 20, wherein said software program is configured to operate the managing computer to display a status history of said selected network element.

30. The system of claim 20, wherein said software program is configured to operate the managing computer to display a pull-down menu containing said plurality of selectable commands.

31. The system of claim 20, wherein said software program is configured to operate the managing computer to display at least one command from a group consisting of restore, remove, diagnose, loopback, and unloopback.

32. The system of claim 20, wherein said software program is configured to operate the managing computer to illustratively depict a starting state of said selected network element.

33. The system of claim 20, wherein said software program is configured to operate the managing computer to ensure the performance of an operation associated with a restore command.

34. The system of claim 20, wherein said software program is configured to operate the managing computer to ensure the performance of an operation associated with a remove command.

35. The system of claim 20, wherein said software program is configured to operate the managing computer to ensure the performance of an operation associated with a diagnose command.

36. The system of claim 20, wherein said software program is configured to operate the managing computer to ensure the performance of an operation associated with a loopback command.

37. The system of claim 21, wherein said software program is configured to operate the managing computer to ensure the performance of an operation associated with an unloopback command.

38. A system for managing a plurality of network elements, the system comprising a plurality of network elements coupled to a managing computer, said managing computer running a software program configured to:
- display a current state of a network element selected from said plurality of network elements;
- display a plurality of selectable commands, each of said plurality of selectable commands being associated with a respective operation, the respective operation affecting the interaction of the selected network element with at least one of the other network elements;
- detect a selection of one of said selectable commands;
- display a state transition diagram corresponding to said selected command, wherein said state transition diagram illustratively depicts at least one predetermined future state of said selected network element that would be realized upon said respective operation associated with said selected command being performed on said selected network element;
- detect that said selected command requires a confirming selection;
- detect a confirmation selection of said selected command; and
- ensure the performance of said respective operation associated with said selected command.

39. The system of claim 38, wherein at least one of said plurality of network elements comprises a speech server.

40. The system of claim 38, wherein at least one of said plurality of network elements comprises a speech processing card.

41. The system of claim 38, wherein at least one of said plurality of network elements comprises a telephone interface card.

42. The system of claim 38, wherein at least one of said plurality of network elements comprises a router.

43. A processor-based system, comprising:
- a processor;
- a display device; and
- a memory device coupled to said processor, said memory device storing a computer readable software program configured to operate said processor-based system as a managing computer for managing a plurality of network elements, said software program operating said managing computer to:
- display on said display device a current state of a network element selected from said plurality of network elements;
- display on said display device a plurality of selectable commands, each of said plurality of selectable commands being associated with a respective operation, the respective operation affecting the interaction of the selected network element with at least one of the other network elements;
- detect a selection of one of said selectable commands;
- display on said display device a state transition diagram corresponding to said selected command, wherein said state transition diagram illustratively depicts at least one predetermined future state of said selected network element that would be realized upon said respective operation associated with said selected command being performed on said selected network element; and
- operate the managing computer to ensure that said respective operation associated with said selected command is performed.

44. The processor-based system of claim 43, wherein said software program is further configured to operate the managing computer to:
- display said plurality of network elements being managed; and
- detect a selection of at least one of said plurality of network elements.

45. The processor-based system of claim 43, wherein said software program is further configured to operate the managing computer to:
- detect that said selected command requires a confirming selection; and
- detect a confirming selection of said selected command before ensuring that said respective operation associated with said selected command is performed.

46. The processor-based system of claim 43, wherein said software program is further configured to operate the managing computer to:
- detect that said selected command requires a confirming selection; and
- abort said selected command.

47. The processor-based system of claim 46, wherein said software program is further configured to operate the managing computer to detect that a confirming selection of said selected command has not been received within a predetermined time after said selected command is selected.

48. The processor-based system of claim 43, wherein said software program is configured to operate the managing computer to display whether said selected network element is currently in service.

49. The processor-based system of claim 43, wherein said software program is configured to operate the managing computer to display a current ambient temperature of said selected network element.

50. The processor-based system of claim 43, wherein said software program is configured to operate the managing computer to display a location of said selected network element.

51. The processor-based system of claim 43, wherein said software program is configured to operate the managing computer to identify the type of network device that has been selected.

52. The processor-based system of claim 43, wherein said software program is configured to operate the managing computer to display a status history of said selected network device.

53. The processor-based system of claim 43, wherein said software program is configured to operate the managing computer to display a pulldown menu containing said plurality of selectable commands.

54. The processor-based system of claim 43, wherein said software program is configured to operate the managing computer to display at least one command from a group consisting of restore, remove, diagnose, loopback, and unloopback.

55. The processor-based system of claim 43, wherein said software program is configured to operate the managing computer to illustratively depict a past state and a current state of said selected network element.

56. The processor-based system of claim 43, wherein said software program is configured to operate the managing computer to ensure the performance of a restore operation associated with a restore command.

57. The processor-based system of claim 43, wherein said software program is configured to operate the managing computer to ensure the performance of a remove operation associated with a remove command.

58. The processor-based system of claim 43, wherein said software program is configured to operate the managing computer to ensure the performance of a diagnose operation associated with a diagnose command.

59. The processor-based system of claim 43, wherein said software program is configured to operate the managing computer to ensure the performance of a loopback operation associated with a loopback command.

60. The processor-based system of claim 43, wherein said software program is configured to operate the managing computer to ensure the performance of an unloopback operation associated with an unloopback command.

61. A processor-based system, comprising:
- a processor;
- a display device; and
- a memory device coupled to said processor, said memory device storing a computer readable software program configured to operate said processor-based system as a managing computer for managing a plurality of network elements, said software program operating said managing computer to:

display a current state of a network element selected from said plurality of network elements;

display a plurality of selectable commands, each of said selectable commands being associated with a respective operation, the respective operation affecting the interaction of the selected network element with at least one of the other network elements;

detect a selection of one of said selectable commands;

display a state transition diagram corresponding to said selected command, wherein said state transition diagram illustratively depicts at least one predetermined future state of said selected network element that would be realized upon said respective operation associated with said selected command being performed on said selected network element;

detect that said selected command requires a confirming selection;

detect a confirmation selection of said selected command; and ensure the performance of said respective operation associated with said selected command.

* * * * *